US006830217B2

(12) United States Patent
Movsesian et al.

(10) Patent No.: US 6,830,217 B2
(45) Date of Patent: Dec. 14, 2004

(54) INTEGRATED COCKPIT DOOR LOCK AND ACCESS SYSTEM

(75) Inventors: Sami Movsesian, Glendale, CA (US); Binh C. Truong, Kirkland, WA (US); Stephen A. Wlles, Los Alamitos, CA (US); Ravinder Jaln, Long Beach, CA (US); Dinanath R. Gharmalkar, Fountain Valley, CA (US); Danny Valdez, Mentebello, CA (US); Stephen A. Kelekian, Montebello, CA (US); Gary L. Bartz, Huntington, CA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 10/255,916

(22) Filed: Sep. 26, 2002

(65) Prior Publication Data

US 2004/0061027 A1 Apr. 1, 2004

(51) Int. Cl.[7] .................................................. B64C 1/14
(52) U.S. Cl. .................................. 244/129.5; 244/118.5
(58) Field of Search .......................... 244/118.5, 129.5, 244/129.4, 121; 49/16, 15

(56) References Cited

U.S. PATENT DOCUMENTS

| 3,812,403 | A | * | 5/1974 | Gartner | 340/5.54 |
|---|---|---|---|---|---|
| 3,967,478 | A | * | 7/1976 | Guinn | 70/144 |
| 4,522,359 | A | * | 6/1985 | Church et al. | 244/129.5 |
| 4,760,393 | A | * | 7/1988 | Mauch | 340/5.54 |
| 5,083,122 | A | * | 1/1992 | Clark | 340/5.22 |
| 5,473,236 | A | * | 12/1995 | Frolov | 318/286 |
| 6,029,484 | A | | 2/2000 | Jetton | |
| 6,218,955 | B1 | * | 4/2001 | Conklin | 340/5.61 |
| 6,259,352 | B1 | * | 7/2001 | Yulkowski et al. | 340/5.7 |
| 6,474,599 | B1 | * | 11/2002 | Stomski | 244/118.5 |
| 2002/0158166 | A1 | * | 10/2002 | Lin | 244/118.5 |

OTHER PUBLICATIONS

Boeing News Clips Article, pp. 1–3; Dennis Blank Chicago Tribune Article, Apr. 21, 2002, "Smile, you're on cabin camera".

* cited by examiner

Primary Examiner—Tien Dinh
(74) Attorney, Agent, or Firm—Harness Dickey & Pierce P.L.C.

(57) ABSTRACT

An electromechanical flight deck door locking system capable of functioning to keep a cockpit door locked in the event of an interruption in electrical power to the system. The flight deck door locking system includes a locking assembly including a locking component and a manually graspable handle for displacing the locking component. Further, the locking system includes an electronic control panel configured to receive data from an individual seeking access to the cockpit and for electrically locking and unlocking the locking assembly. The locking system also includes a mechanical locking assembly, such as a key lock, whereby a user can use a key to lock and unlock the door if electrical power to the system is unavailable.

27 Claims, 10 Drawing Sheets

INTEGRATED COCKPIT DOOR LOCK AND ACCESS SYSTEM

FIELD OF THE INVENTION

The present invention relates generally to door locking systems, and more particularly to an aircraft cockpit door locking system that allows the cockpit door to remain locked and functional in the event of a power shortage affecting the electronic components associated with the door locking system.

BACKGROUND OF THE INVENTION

Effectively controlling access to the cockpit of a passenger aircraft helps to control numerous risks associated with unauthorized cockpit entry. Typically, aircraft personnel have controlled access to cockpits through electronic locking mechanisms disposed on or in the cockpit door. Electronic locking systems typically involve solenoid systems comprising an electric solenoid and a keypad, wherein the solenoid automatically locks upon closing the door and unlocks upon a cabin crew member entering an access code with the keypad.

While the electronic system effectively controls access, some situations could arise where the effectiveness of the system may be compromised. For example, an individual might be able to traverse the security of the electronic system by cutting the power supply conductors to the system, thus de-energizing the solenoid and unlocking the door. This scenario would apply to those systems where power is being supplied to the solenoid to hold it in an engaged, i.e., locked position. Furthermore, an individual might be able to traverse an electronic security system by witnessing a cabin crew member enter an access code, and subsequently re-entering the same access code.

Thus, it would be desirable to provide an even safer, more secure cockpit door locking system. More specifically, it would be desirable to provide a locking system that eliminates the aforesaid risks of a purely electronic system in the event of a power shortage or unauthorized use of the access code. Furthermore, it would be desirable to have a door locking system that remains locked, yet otherwise operational, in the event of an interruption of power to the components of the door security system.

SUMMARY OF THE INVENTION

The present invention is directed to a cockpit door locking system having an electromechanical locking assembly capable of maintaining a door locking mechanism in its locked position in the event of a power shortage. One preferred embodiment of the present invention includes an electronic control panel for controlling the cockpit door locking assembly when supplied with electrical power. The locking assembly is situated in or on the cockpit door and includes a locking component, such as a latch or a dead bolt, that remains locked whether or not the system remains energized. The electronic control panel further controls a user input device adapted to receive an access code from a cabin crew member. The electronic control panel thereafter informs the cockpit crew that a cabin crew member has requested access, and the cockpit crew can choose to grant or deny access. The cockpit door locking system also includes a mechanical key lock assembly that requires engagement by a physical key which can: (1) lock or unlock the locking assembly in the event of a power shortage; and (2) act as a substitute for the security code when power is available for system operation.

The cockpit door locking mechanism of the present invention therefore provides the benefit of restricting access to the cockpit of an aircraft through the use of a robust electromechanical system. Importantly, the system is capable of maintaining the cockpit door in a locked condition in the event of a power shortage.

Further areas of applicability of the present invention will become apparent from the detailed description provided hereinafter. It should be understood that the following detailed description and specific examples discussed herein are only provided to illustrate the invention and should not to be construed as limiting its scope.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
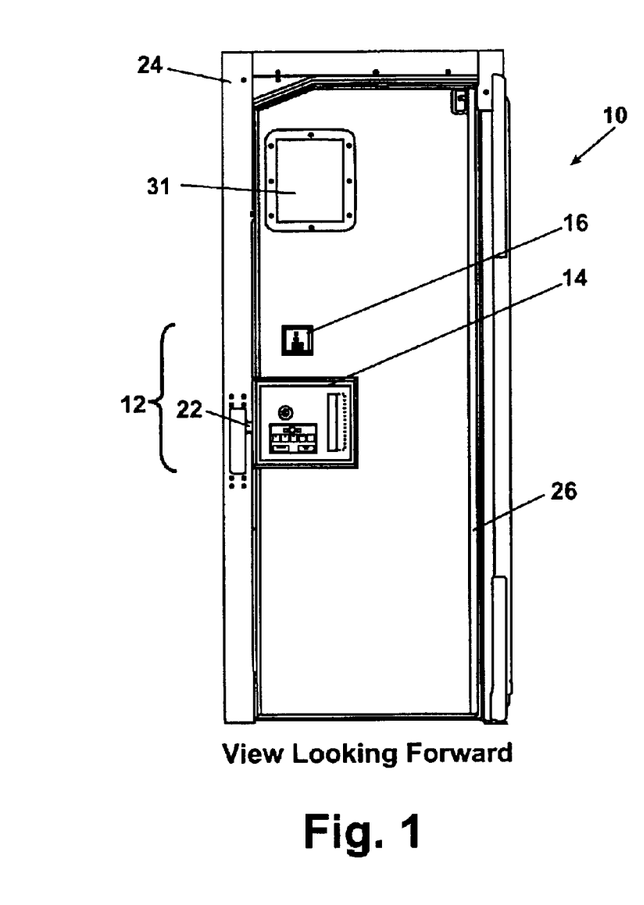
FIG. 1 is an elevation view of a cockpit door including a preferred embodiment of a door locking system in accordance with the present invention as viewed from the cabin of an aircraft.
Figure 2:
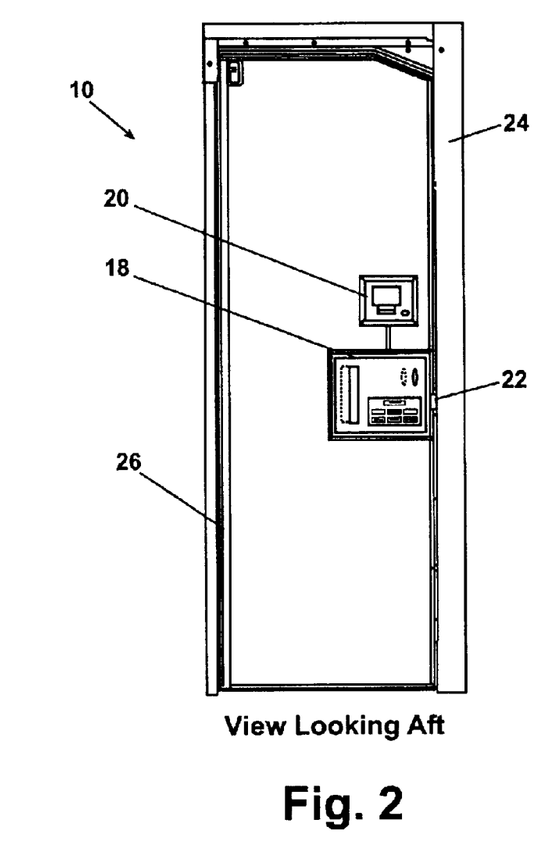
FIG. 2 is an elevation view of the cockpit door of FIG. 1, including the door locking system of a preferred embodiment of the present invention, as viewed from the cockpit of an aircraft.

Referring to FIGS. 1 and 2, a cockpit door 10 includes a door locking system (DLS) 12 of the present invention. FIG.

1 provides a view of the cockpit door 10 looking forward from the cabin area of an aircraft. A main cabin panel 14 replaces the door knob/lock known in the art. A secondary cabin panel 16 is also provided above the main cabin panel 14. FIG. 2 provides a view of the cockpit door 10 looking aft from the cockpit spaces showing a main cockpit panel 18 which interconnects through the cockpit door 10 with the main cabin panel 14. A secondary cockpit panel 20 interconnects through the cockpit door 10 with the secondary cabin panel 16. A latch 22 (shown in an extended and locked position) extends from the DLS 12 to engage within a suitable recess within a door frame 24. When extended, the latch 22 provides a positive means to close and/or lock the cockpit door 10. In a retracted/unlatched position for the latch 22 (shown in phantom in FIG. 3), the cockpit door 10 is free to rotate about a hinge 26. For the embodiment shown in FIGS. 1 and 2, a portion of the main cabin panel 14 overlaps the door frame 24 therefore permitting the cockpit door 10 to open in an aft only direction. By slightly overlapping the main cabin panel 14, unauthorized access to attempt to displace the latch 22 is prevented.

FIG. 1 also shows an access panel 31 which is known in the art. The access panel 31 can be used as an overpressure plug which permits equalization of pressure on both sides of the cockpit door 10 in the event of a rapid depressurization. The cockpit door 10 shown is depicted as a left handed door (i.e., hinged on the right in FIG. 1). The DLS 12 can also be used on a right handed door (i.e., hinged on the left).

Figure 3:
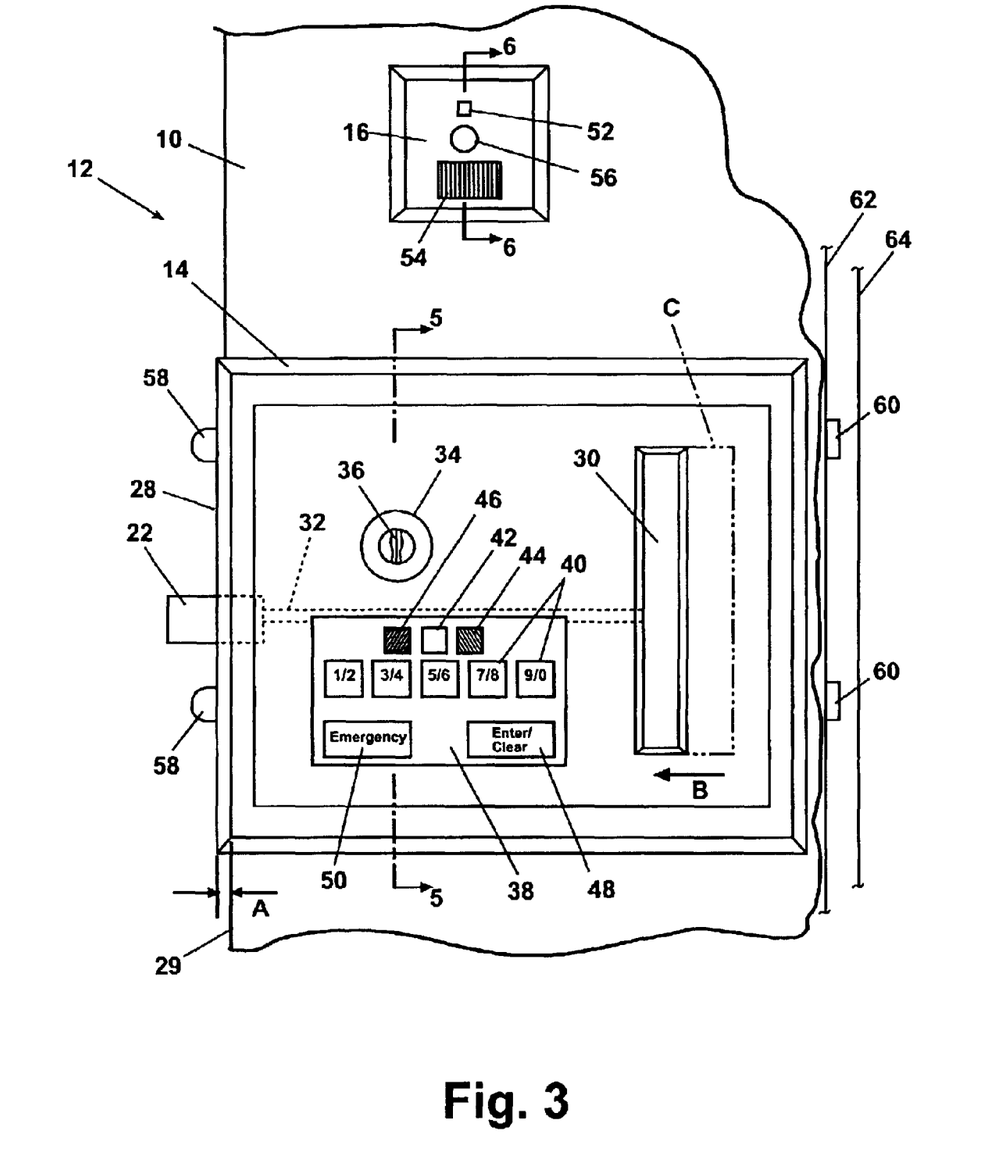
FIG. 3 is a detailed elevation view of the door locking system shown in FIG. 1.

Referring now to FIG. 3, the portion of the DLS 12 shown in FIG. 1 is further detailed. The main cabin panel 14 includes an overlap portion 28 which extends beyond the door edge 29 by a panel overlap dimension A. Panel overlap dimension A can be varied depending upon the thickness of the cockpit door 10 and the available access to the latch 22 at the overlap portion 28.

A latch handle 30 is shown in its biased latched position. A spring means (not shown) biases the latch handle 30 in the biased latching direction B as shown. A latch handle open position C, shown in phantom, is achieved by manually sliding the latch handle 30 against the tension of the spring means. The latch handle 30 is connected to a latch lever 32 which in turn connects to the latch 22 to displace the latch 22 between its extended position (shown) in its retracted position (shown in phantom). In a preferred embodiment, the latch handle 30 includes a recess between the latch handle 30 and the main cabin panel 14 such that an operator reaches within the recess and therefore within the enclosure of the main cabin panel 14 in order to access the latch handle 30 for manual operation. By providing a recess for the latch handle 30, the extension of the latch handle 30 above the surface of the main cabin panel 14 is minimized and therefore the ability to damage or dislodge the latch handle 30 is reduced.

Figure 4:
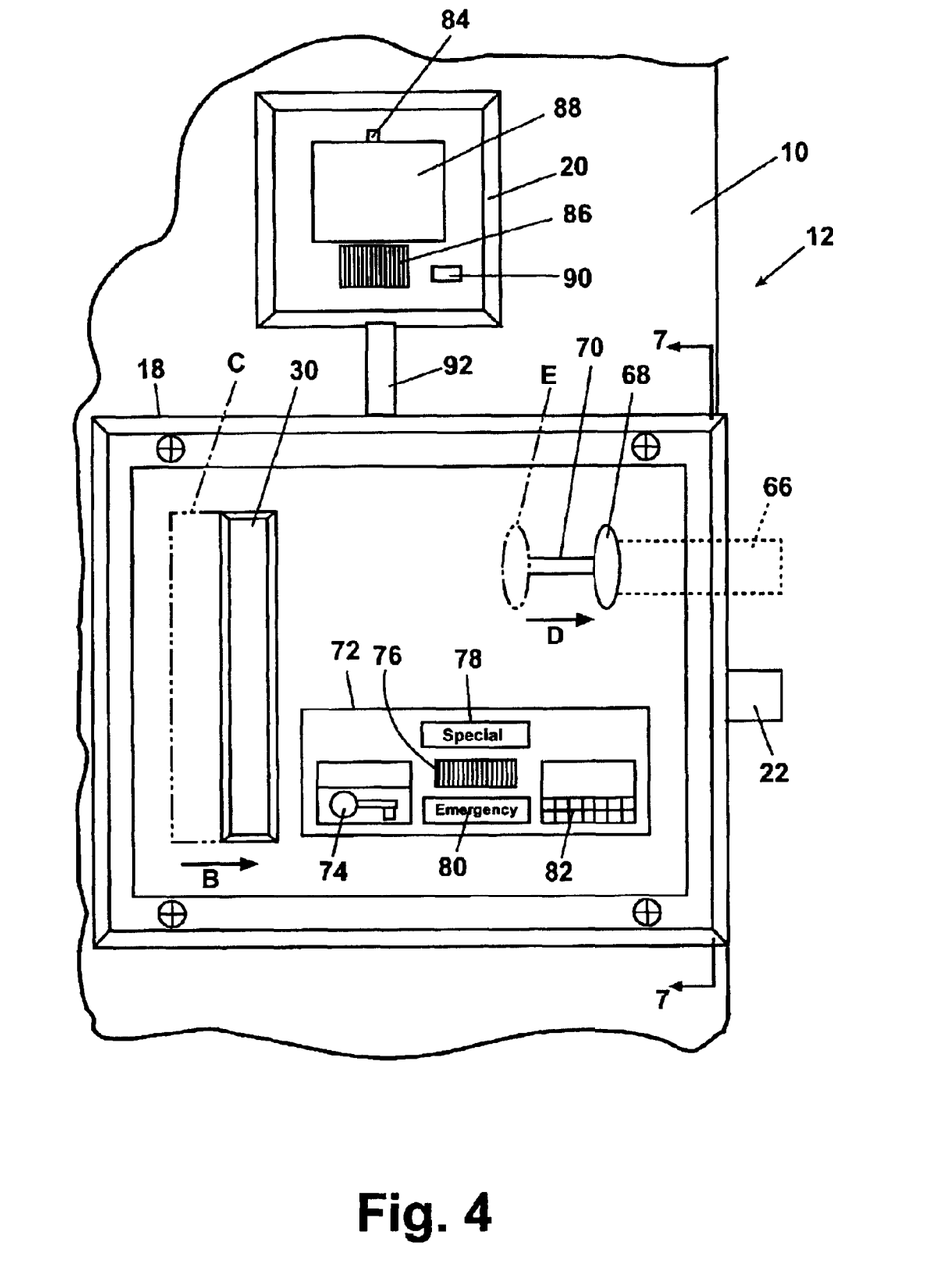
FIG. 4 is a detailed elevation view of the door locking system shown in FIG. 2.
Figure 5:
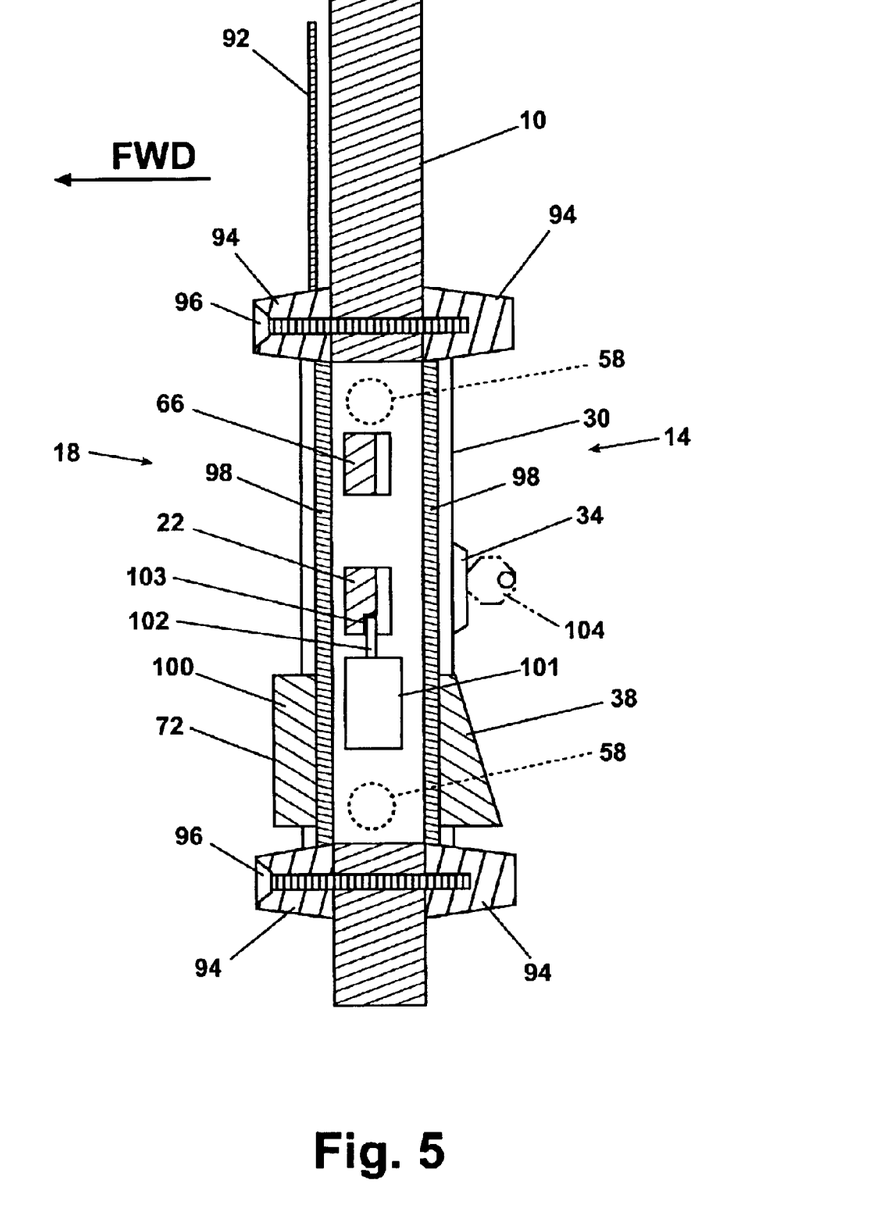
FIG. 5 is a sectioned elevation view taken at Section 5 of FIG. 3 showing the latch and dead bolts and the interconnection between the solenoid and the latch.

The main cabin panel 14 also includes a key lock assembly 34 having a key slot 36 for insertion of a mechanical key (shown in FIG. 5). The mechanical key when placed in the key slot 36 provides the capability of initiating an unlock procedure of the DLS 12 when power is supplied to the DLS 12 or manually unlocking the DLS 12 when power is unavailable to the system. The key is normally stowed in a secured area in the passenger cabin of an aircraft. An electronic keypad 38 is also shown. The electronic keypad 38 includes a plurality of depressible keys 40 for entering a security code to unlock the DLS 12. As soon as one of the depressible keys 40 is depressed, an in-process light 42 illuminates, indicating that the system is energized and is ready to accept the access code from the user. If a valid access code is entered using the depressible keys 40, cockpit personnel have an option to admit or deny admission, which is discussed further herein. An OK-to-access light 44 illuminates if authority to enter is provided. If an improper access code is entered, or by selection of one of the cockpit crew to deny access to the operator, an access denied light 46 illuminates. After entering the predetermined number of digits for the access code, the operator presses an enter/clear button 48 to enter the data into the DLS 12. An emergency button 50 is also provided for an operator to identify an emergency situation to members of the cockpit crew. The secondary cabin panel 16 provides a microphone 52, a speaker 54, and a camera lens 56. The operator can speak to cockpit crew in the cockpit area by speaking into the microphone 52 and can hear a reply through the speaker 54. The camera lens 56 provides an image of the operator standing at the cockpit door 10 to personnel in the cockpit area via a monitor shown and described in reference to FIG. 4.

Electrical power is provided to the DLS 12 by a plurality of power contact points 58. In a preferred embodiment, a power source (discussed in reference to FIG. 10) provides direct current power through two power contact points 58. The power contact points 58 provide a mechanical/electrical connection between the DLS system 12 and the power source through similar mechanical/electrical connectors provided on the door frame 24 (discussed in reference to FIGS. 7A through 8B). The power contact points 58 are preferably deflectable using a spring biasing system such that closure of the cockpit door depresses each of the power contact points 58 and a spring bias ensures electrical contact is maintained when the cockpit door is in a closed position.

In another preferred embodiment of the present invention, power contact points 60 are used to provide electrical power to the portion of the DLS 12 mounted on the cockpit door 10. The power contact points 60 are connected to a hinge edge 62 of the cockpit door 10 and the power contact points 60 electrically connect to contact areas on a frame panel 64 of the door frame 24. Similar to the power contact points 58, the power contact points 60 are preferably deflectable using a spring biasing mechanism (not shown) to ensure electrical contact.

Referring to FIG. 4, the DLS 12 as viewed from the cockpit side of the cockpit door 10 is further detailed. In another preferred embodiment of the present invention, the main cockpit panel 18 provides a sliding dead bolt 66 actuated by a dead bolt knob 68. The dead bolt knob 68 slides in the dead bolt slide direction D from a normally open position E to the locked position shown in FIG. 4 by manual displacement of the dead bolt knob 68. The dead bolt knob 68 and the dead bolt 66 provide an additional security level for the cockpit door 10 in the event of an emergency situation. The dead bolt knob 68 translates within a slot 70 provided in the main cockpit panel 18 for this purpose. The latch 22 is also shown in its extended and locked position. An access use panel 72 provides visual and audible indication to personnel in the cockpit area of an aircraft of an operator on the cabin side of the cockpit door 10 attempting to enter an access code to open the cockpit door 10, or using a key to manually open the cockpit door 10. If an attempt to use a key in the key lock assembly 34 shown in FIG. 3 is made, a manual key-use light 74 is illuminated. A speaker 76 sounds a chime or similar distinguishable audible signal to cockpit crew of either entry of an access code or manual insertion of a key. A special indicator light 78 illuminates if personnel in the cabin spaces of an aircraft identify a special condition exists in the cabin area. An emergency indicator light 80 illuminates if an operator in the cabin of the aircraft depresses the emergency button 50 on the main cabin panel 14. Similarly, an electronic key pad indicator 82 is provided on the access use panel 72. The electronic key pad indicator 82 illuminates when a user enters one or more numbers on the electronic key pad 38 shown in FIG. 3.

The secondary cockpit panel 20 provides a microphone 84, a speaker 86, a monitor 88, and a cabin view button 90, respectively. The microphone 84 permits cockpit personnel to converse with an operator standing at the cabin side of the cockpit door 10. The speaker 86 allows cockpit personnel to hear the operator standing at the aft side of the cockpit door 10. The monitor 88 operates either by manual selection or automatically. The monitor 88 provides a visual image of the operator or the space adjacent to the cabin side of the cockpit door 10 when manually selected by depressing the cabin view button 90. Personnel in the cockpit spaces can also depress the cabin view button 90 to get a general view of the cabin spaces if no operator is present before unlocking the cockpit door 10 for any other reason. The monitor 88 also automatically operates when either an access code is entered or a key is turned in the key lock assembly 34 on the main cabin panel 14. The image for the monitor 88 is provided by the camera lens 56 identified in FIG. 3. Electrical power for the secondary cockpit panel 20 components is provided from the DLS 12 via wiring disposed in an electrical conduit 92 positioned on the forward facing surface of the cockpit door 10 between the main cockpit panel 18 and the secondary cockpit panel 20.

Referring to FIG. 5, further details of the DLS 12 are provided in a section view. A protective frame 94 joins the main cabin panel 14 to the main cockpit panel 18 via a plurality of fasteners 96 provided on the cockpit side of the cockpit door 10. Individual layers of polymer such as Kevlar® ballistic resistant material form protective layers 98. Within the access use panel 72 is a chime 100. The audible sounds from the chime 100 are heard in the cockpit spaces of the aircraft via the speaker 76 provided on the access use panel 72 shown in FIG. 4. Within the envelope of the cockpit door 10 a solenoid 101 is positioned. The solenoid 101 includes a solenoid shaft 102 which is shown in a fully extended position engaging with a shaft recess 103 of the latch 22. When the solenoid shaft 102 engages the shaft recess 103, the latch 22 is mechanically and electrically retained in the fully extended and locked position shown in FIG. 1. A key 104 is shown engaging the key lock assembly 34. By manually rotating the key 104, a request to enter signal is passed to the DLS 12. This request to enter signal is similar to the signal generated when a proper access code is entered into the electronic key pad 38. If no power is available to the DLS 12 when the key 104 is rotated, the key lock assembly 34 acts to disengage the solenoid shaft 102 from the shaft recess 103 thus permitting the latch 22 to be disengaged from its extended and locked position by the latch handle 30. If power is available to the solenoid 101, actuation of the key 104 does not dislodge the solenoid shaft 102; therefore, action, by cockpit personnel is required to authorize entry by providing a permission signal to open the cockpit door 10.

The protective frame 94 joins many of the DLS 12 component parts including the main cabin panel 14 to the main cockpit panel 18. The protective frame 94 also provides physical protection against damage for the electronic components of the DLS 12 by impacting adjacent equipment before the electronic components impact the adjacent equipment. The fasteners 96 are positioned only on the cockpit side of the cockpit door 10 such that removal of the fasteners is only accessible from the cockpit side.

Figure 6:
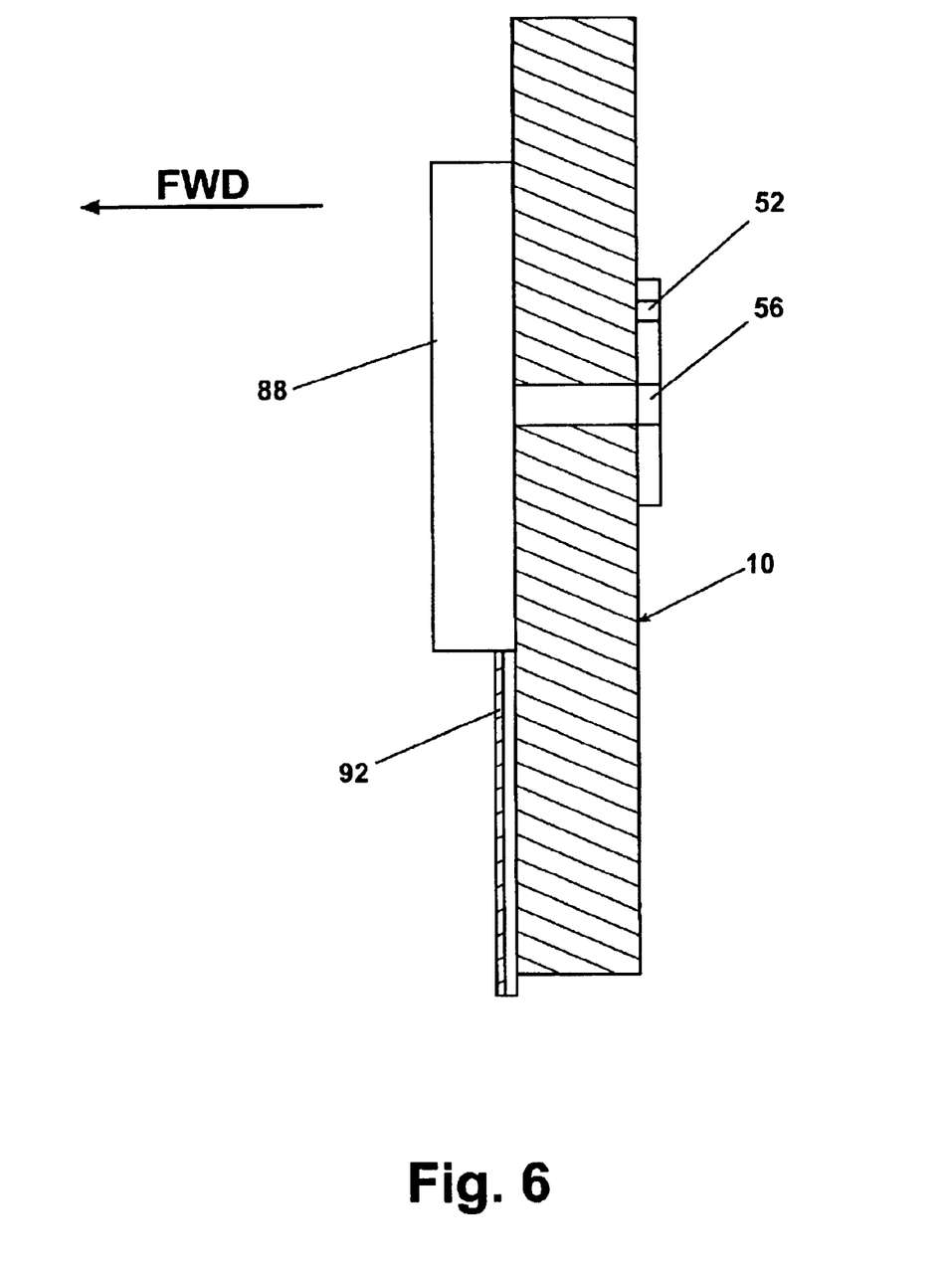
FIG. 6 is a sectioned elevation view taken at Section 6 of FIG. 3 showing the monitor and the camera lens in the microphone on both sides of the cockpit door.

Referring to FIG. 6, a cross section of the cockpit door 10 adjacent to the monitor 88, the microphone 52, and the camera lens 56 is shown. The camera lens 56 is disposed in a through aperture such that it optically connects the cabin side of the cockpit door 10 and the forward or cockpit side of the cockpit door 10. In a preferred embodiment, the monitor 88 includes a diagonal dimension between approximately 15 cm (6 in) to approximately 18 cm (7 inches) such that an image on the monitor 88 is visible to cockpit personnel in their seated positions.

Figures 7A, 7C:
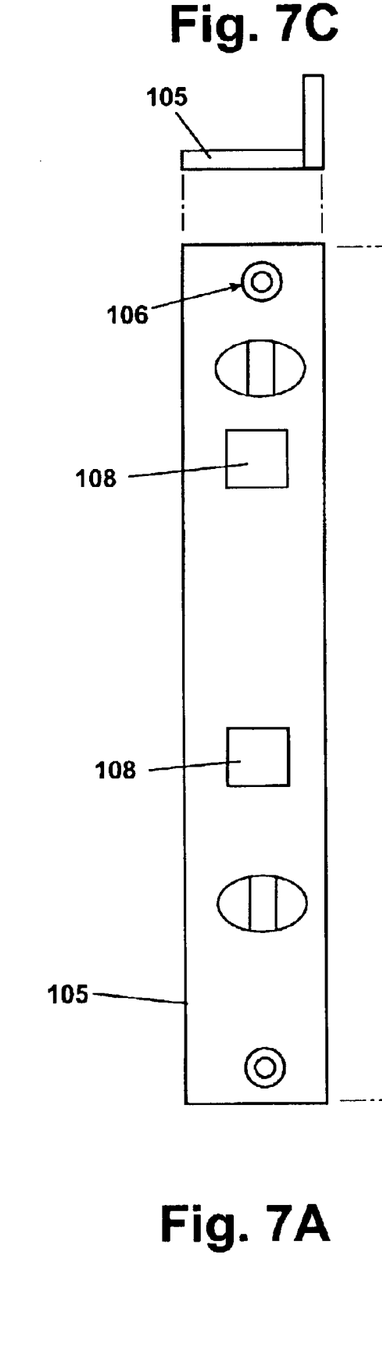
FIG. 7A is a side elevation view taken at Section 7 of FIG. 4 identifying an L-shaped striker plate having apertures for both a latch and a dead bolt and power contact points for electrical connection between a door jam and the door locking system of the present invention.
FIG. 7C is a top plan view of the L-shaped striker plate of FIG. 7A.
Figure 7B:
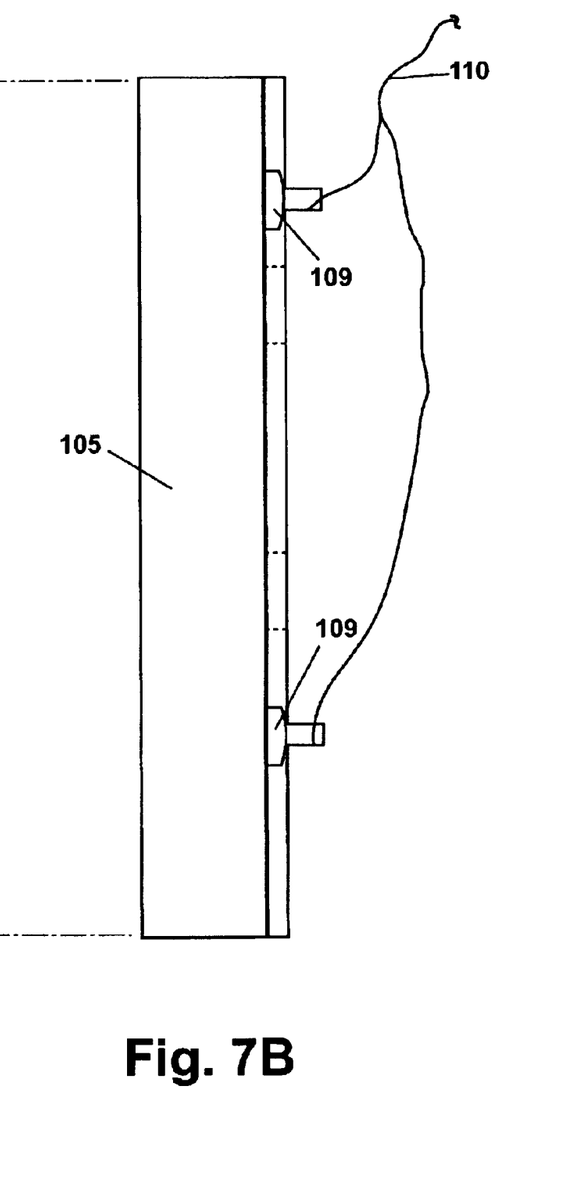
FIG. 7B is a side elevation view of FIG. 7A identifying the power wires connected to each of the power contact points.

Referring to FIGS. 7A, 7B, and 7C, an exemplary L-shaped striker plate 105 is detailed. The L-shaped striker plate 105 is mechanically attached to the door frame 24 using a plurality of fasteners (not shown) mounted through a plurality of fastener apertures 106. Latch apertures 108 are provided as clearance openings for the latch 22 and dead bolt 66 (if used). Power contact points 109 are aligned to contact each of the power contact points 58 or power contact points 60 (shown in FIG. 3) to provide electrical power to the DLS 12. Power wires 110 connect to each of the power contact points 109 and lead to a power source which is described in greater detail in reference to FIG. 10.

Figure 8A:
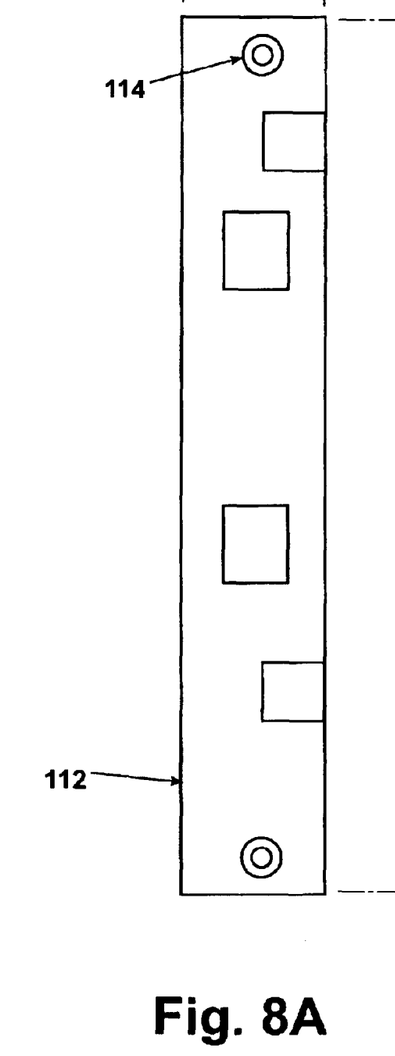
FIG. 8A is an elevation view of a flat striker plate embodiment of the present invention.
Figure 8B:
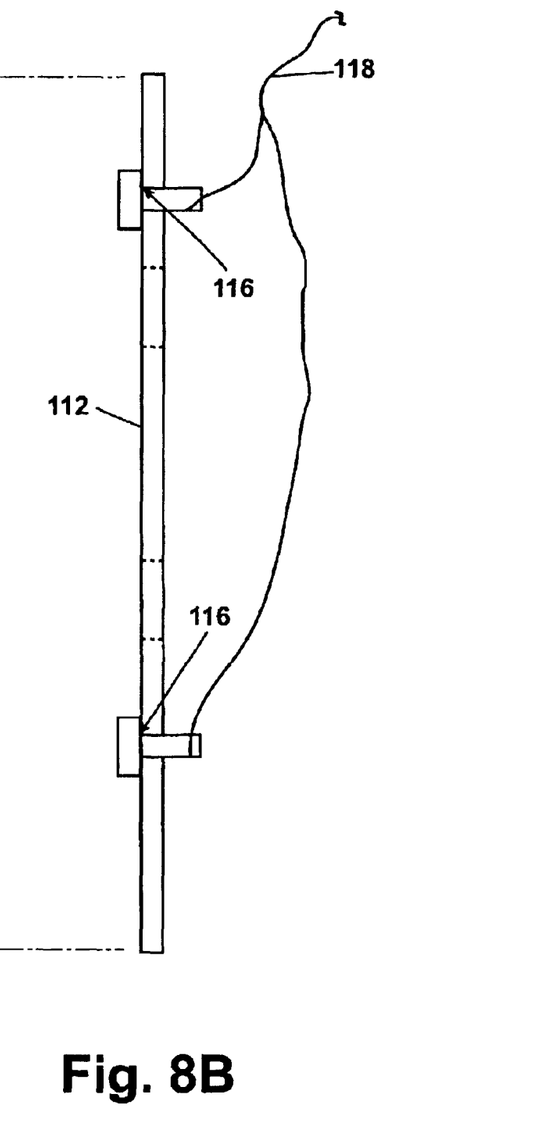
FIG. 8B is a side elevation view of the flat striker plate of FIG. 8A further showing rectangular power contact points and the power wires connected to the contact points.
Figure 8C:
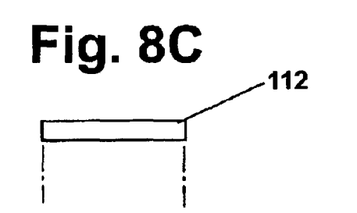
FIG. 8C is a top plan view of the flat striker plate of FIG. 8A.

Referring to FIGS. 8A, 8B and 8C, another preferred embodiment for a strike plate is shown. A rectangular, flat strike plate 112 is similarly provided with a plurality of fastener apertures 114 to matably accept fasteners to join the flat strike plate 112 to the door frame 24. Rectangular shaped power contact points 116 are provided with power wires 118 to contact either the power contact points 58 or the power contact points 60 (shown in FIG. 3).

Figure 9:
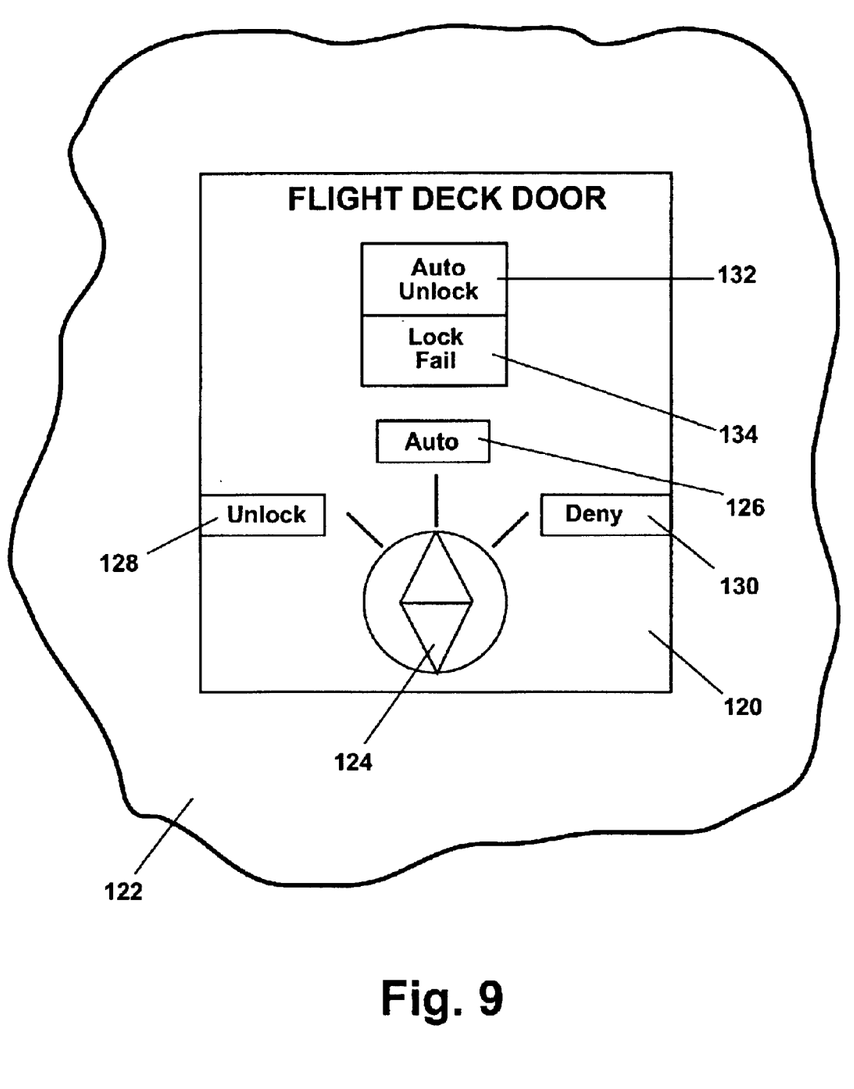
FIG. 9 is an elevation view of a door access panel of a preferred embodiment of the present invention mounted on an aircraft cockpit panel.

Referring to FIG. 9, a door access panel 120 which is mounted on a cockpit panel 122 is detailed. The cockpit panel 122 can be any one of a plurality of panels available in the cockpit area of an aircraft. The door access panel 120 is positioned for operation by cockpit personnel. The door access panel 120 includes a manual switch 124. The manual switch 124 is positionable in 3 positions. The manual switch 124 is normally biased into an automatic switch position by a spring mechanism (not shown). In the automatic position shown for the manual switch 124, when an operator in the cabin attempts to input an access code or turns a key 104 (shown in FIG. 5), an auto switch light 126 illuminates to identify to cockpit personnel that a predetermined time period (approximately 30 seconds) is initiated during which the cockpit personnel can elect to permit opening the cockpit door 10 or deny opening the cockpit door 10. If the cockpit personnel elect to allow opening the cockpit door 10, the manual switch 124 is rotated to an unlock position which illuminates an unlock switch light 128 and de-energizes the solenoid 101 (shown in FIG. 5). This permits entry from the cabin area by disengaging the solenoid shaft 102 such that the latch handle 30 is operable. Release of the manual switch 124 returns the manual switch 124 to the automatic position as shown. If cockpit personnel elect to deny access into the cockpit, the manual switch 124 is rotated to a deny position and a deny switch light 130 is illuminated. In the deny position, electrical power to the solenoid 101 is maintained and the cockpit door 10 remains in a locked position. An auto unlock light 132 is illuminated any time that an operator attempts to open the cockpit door 10. A lock fail light 134 is illuminated when power to the solenoid 101 and the DLS 12 is unavailable.

Turning now to the operation of the DLS 12, immediately subsequent to the cockpit door 10 closing, the latch handle 30 is spring biased to a closed position (shown in FIG. 1) and the DLS 12 automatically provides power to the solenoid 101 to engage the latch 22 by displacing the solenoid shaft 102 into the shaft recess 103. This position for the solenoid shaft 102 causes the latch 22 to be retained in a locked position (as shown in FIG. 1). In this position, the latch 22 is not affected by either a power loss or temporary interruption to the DLS 12, and remains in the locked position during a power loss to the solenoid 101. At any time a user, such as a cabin crew member, can enter an access code into the electronic key pad 38. The electronic key pad 38 is actuated by depressing each of a plurality of depressible keys 40 in appropriate sequence indicating a proper access code followed by pressing the enter/clear button 48. The number of digits in a valid access code can vary and is preferably in a range between 4 to 6 numbers. It should be appreciated that any type of electronic input device could be implemented in lieu of a keypad and the present invention is therefore not limited to only the use of the electronic key pad 38 as an input device. Any form of personnel identification means (e.g., magnetic card, fingerprint identification, etc.) or a remote transmission device (not shown) can also be used to input the access code.

Figure 10:
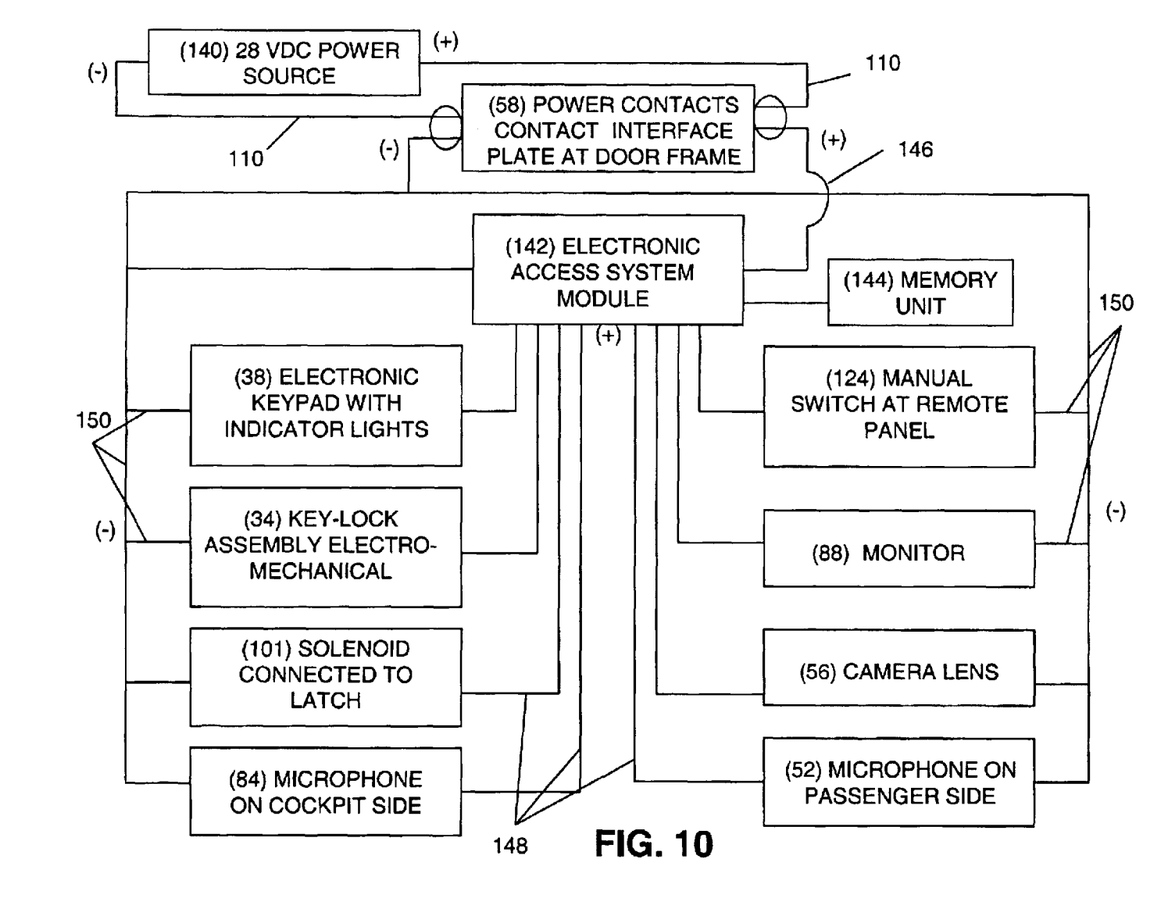
FIG. 10 is a schematic of the major components for a preferred embodiment of a door locking system of the invention.

Referring to FIG. 10, power to the DLS 12 is provided by a 28 volt DC power source 140 associated with the aircraft. The power wires 110 connect the 28 volt DC power source 140 to the power contact points 58. As evident from FIG. 10, if the cockpit door 10 is in an open position and the power contact points 58 do not contact with their associated power contact points 109 (shown in FIG. 7B) or do not contact with the power contact points 116 shown in FIG. 8B, power from the 28 volt DC power source 140 is disconnected from the DLS 12. From the power contact points 58, 28 volt DC power is provided to an electronic access system module (EASM) 142. The EASM contains a stored version of the access code in a memory unit 144 of the EASM 142. When an access code is entered by a user, the EASM 142 compares the entered access code to the access code stored in the memory unit 144 and identifies if a match exists. If a match exists, power is transferred along a power line 146 to the EASM and is distributed along one of a plurality of power lines 148 to individual components of the DLS 12. As shown in FIG. 10, the individual components of the DLS 12 include the manual switch 124, the monitor 88, the camera lens 56, the microphone 52, the microphone 84, the solenoid 101, the key lock assembly 34, and the electronic key pad 38. The EASM 142 provides power to the solenoid 101 to withdraw the solenoid shaft 102 from its extended position preventing opening of the cockpit door 10 as discussed in reference to FIG. 5. Each of the connected components of the DLS 12 are connected to a second side of the 28 volt DC power source 140 by power lines 150.

In the event of a power shortage, a cabin crew member may still gain access to the cockpit area via the key lock assembly 34. The key lock assembly 34 provides the ability to manually actuate the solenoid shaft 102 to displace the solenoid shaft 102 from its contact position with the latch 22.

Figure 11:
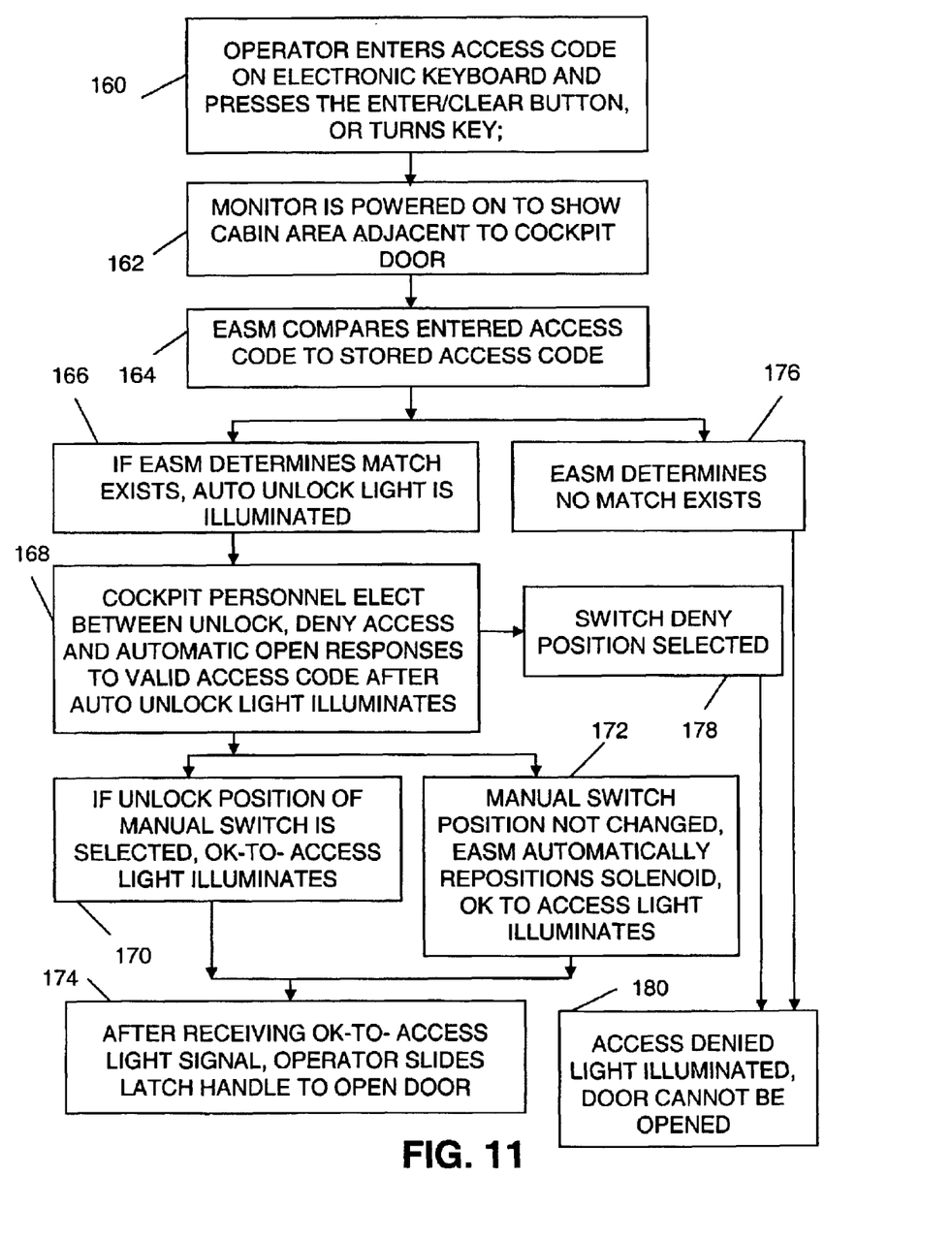
FIG. 11 is a block diagram identifying the operational steps to operate a door locking system of the present invention.

Referring to FIG. 11, the operational steps to use the DLS 12 are described. At a step 160, an operator on the cabin side of the cockpit door enters an access code into the electronic keyboard. When the access code is entered and the enter/clear button is depressed, several events occur simultaneously. The in-process light on the electronic keyboard illuminates after the enter/clear button is depressed. The electronic keypad indicator on the cockpit side of the cockpit door illuminates to indicate that an entry has been made into the electronic key pad. A chime sounds in the cockpit area via the speaker 76 in the access use panel and a 30 second operational period begins to count down automatically. At a step 162, when the access code is entered into the electronic key pad, the EASM energizes the monitor and the monitor depicts on its screen the image taken through the camera lens of the area immediately adjacent to the cockpit door. At a step 164 the EASM compares the entered code to the preset code in its memory unit to identify if a match exists. If a match exists, at a step 166 the auto unlock light is illuminated on the door access panel attached to the cockpit panel.

As further described in FIG. 11, at a step 168, the cockpit personnel have a predetermined amount of time (approximately 30 seconds) to elect to unlock the cockpit door or deny access to the cockpit. During this period of time the personnel in the cockpit can rotate the manual switch on the door access panel to the unlock position, or they can choose to rotate the manual switch to the deny position on the door access panel. At a step 170, if the unlock position of the manual switch is selected, the OK-to-access light illuminates on the electronic key pad. At a parallel step 172, if the manual switch is not rotated to either the unlock or the deny positions for the period of 30 seconds, the EASM after 30 seconds automatically repositions the solenoid to permit opening of the cockpit door and the OK-to-access light illuminates on the electronic key pad. At an opening step 174, after the OK-to-access light is illuminated on the electronic keypad, an operator on the cabin side manually slides the latch handle to unlock and open the cockpit door.

At a step 176, which parallels the step 166, the EASM determines that no match exists to the entered access code. At a step 178, which parallels the step 168, the deny position for the manual switch 124 is selected. At a step 180, which follows either the step 176 or the step 178, the access denied light 46 is illuminated on the main cabin panel 14, the solenoid 101 position is unchanged and the cockpit door 10 cannot be opened.

An alternate method to open the cockpit door 10 provides that the key 104 can be inserted into the key lock assembly 34 and turned. When the key 104 is turned it provides a similar electronic signal to that sent when an operator enters an access code into the electronic key pad 38. Cockpit personnel have the option of unlocking the cockpit door 10 or to deny opening the cockpit door 10 using the manual switch 124 as described above. The chime 100 also sounds in the cockpit area when the key 104 is rotated in the key lock assembly 34, therefore audibly identifying that an attempt is being made to open the cockpit door 10. The manual key use light 74 illuminates on the access use panel 72 when the key 104 is rotated.

If cockpit personnel elect to deny access into the cockpit area and rotate the manual switch 124 on the door access panel 120 to the deny position, the access denied light 46 on the electronic key pad 38 illuminates indicating to the user that the cockpit door 10 cannot be opened using the latch handle 30. If cockpit personnel are incapacitated and the manual switch 124 is in the normal automatic position, a 30 second wait period applies after entry of a valid access code or operation of the key 104 before the operator receives the OK to access light 44 signal to open the cockpit door 10.

At any time during operation of the aircraft when cockpit personnel need to open the cockpit door 10, a visual inspection of the cabin via the monitor 88 is obtainable by depressing the cabin view button 90 on the secondary cockpit panel 20. Depressing the cabin view button 90 displays a view of the cabin area immediately adjacent to the cockpit door 10. This enables cockpit personnel to identify if an unsafe condition exists prior to opening the cockpit door 10. At any time when cockpit personnel identify that an emergency situation exists on the cabin side of the cockpit door, the dead bolt 66 can be manually positioned to lock the cockpit door 10. The dead bolt 66 is not controlled by the solenoid 101 and therefore the cockpit door 10 cannot be opened with the dead bolt 66 in its extended, (i.e., locked) position. The dead bolt 66 is an optional feature since it overrides the electrical features of the door locking system 12 of the present invention. Cockpit personnel can-open the cockpit door 10 by positioning the manual switch 124 to the unlock position and operating the latch handle 30 on the main cockpit panel 18. If power is unavailable to the DLS 12, personnel in the cockpit (i.e., flight crew or maintenance personnel) can operate the latch handle 30 which from the cockpit side overrides the solenoid 101.

In another preferred embodiment of the present invention, Specific time periods are used for DLS 12 operation. If a cabin crew member enters a valid access code and the cockpit personnel take no action to reposition the manual switch 124 for a first fixed period of time (in a preferred embodiment, approximately 30 seconds), the EASM 142 repositions the solenoid shaft 102 automatically after the first fixed period of time. Subsequent to the first fixed period of time, a user can manipulate the latch handle 30 to displace the latch 22 for a second fixed period of time (in a preferred embodiment, approximately 30 seconds). If the user fails to displace the latch handle 30 within the second fixed period of time, the EASM 142 automatically returns the solenoid shaft 102 to its engaged position with the latch 22, preventing opening of the cockpit door 10. The first and second fixed periods of time are described herein as approximately 30 seconds; however any period of time can be selected by the aircraft designer or the aircraft operators.

The electromechanical architecture of the DLS 12 of the present invention provides numerous advantages over prior systems. First, the architecture provides graphical identification that a user seeks access to the cockpit area, thereafter enabling cockpit personnel to grant access, deny access, or allow the DLS 12 to continue in an automatic mode. The architecture also provides the advantage of maintaining the cockpit door in its locked position in the event of a power shortage. The DLS 12 further includes a mechanical key mechanism to lock and unlock the cockpit door in the event of a power shortage or if the access code is unavailable to an operator on the cabin side of the cockpit door. The DLS 12 of the present invention further advantageously provides that electrical power for the system is provided through contacts at the cockpit door such that system power is disconnected when the door is in an open position and is connected while the cockpit door is in its closed and/or locked position. The use of power contact points between the door structure and the door locking system 12 of the present invention eliminates the need for flexible wiring or a more complex system of providing electrical power to the door locking system 12 of the present invention.

What is claimed is:

1. An electro-mechanical door locking system adaptable for both locking and unlocking a door, said door being pivotally mounted to a door frame, said system comprising:
   a control panel mountable on said door;
   an electronic input device positioned on the control panel controlled by said control panel for enabling a first user to input access data;
   an indicator panel positioned opposite from said control panel about said door and controlled by said control panel, said indicator panel having both an audible indicator and a visible indicator for indication to a second user of entry of the access data;
   a locking latch electro-mechanically connectable to said control panel having an extendable locked position engaging said door frame;
   at least one control panel power contact point electrically connectable to said control panel; and
   at least one door frame mountable power contact point, each alignable with said control panel power contact point;
   wherein electrical power provided to said door frame power contact point is provided to said door locking system by contact between said power contact point for one of maintaining said locking latch in said locked position and releasing said locking latch from said locked position.

2. The system of claim 1, comprising:
   said electronic input device including an access code entry port; and
   at least one authorized access code communicable to said access code entry port to electrically release said locking latch.

3. The system of claim 2, comprising:
   a mechanical locking port connectable to said electronic control panel; and
   a key rotatably engaging said mechanical locking port to electrically release said locking latch.

4. The system of claim 3, comprising:
   a handle mechanically linked to said locking latch; and
   said handle being displaceable between each of a door latched position and a door open position;
   wherein said handle is displaceable from said door latched position to said door open position following one of said authorized access code entry and said key engagement releasing said locking latch.

5. The system of claim 1, wherein the visible indicator comprises a camera image producing monitor.

6. The system of claim 1, wherein the visible indicator comprises an electronic key pad indicator.

7. A door locking system having a user overridable locking mechanism that can be overridden in the event of a power shortage, for use in a mobile platform having a cabin and a cockpit separated by a door, the system comprising:
   an electronic control panel for controlling said door locking system when supplied with power;
   a user input device controlled by said electronic control panel for enabling a user to input an access code for unlocking said door locking system;
   a camera lens disposed on said door, said camera lens controlled by said electronic control panel and producing images of an area adjacent to said user input device;
   a locking assembly disposed on said door and including a locking component, said locking assembly being responsive to said electronic control panel for automatically actuating said locking component; and
   said locking assembly further including a mechanical key lock assembly requiring engagement by a key for urging said locking component into an unlocked position in the event of a power shortage to said door locking system.

8. The system of claim 7, wherein said locking component remains locked in the event of a power shortage to said door locking system.

9. The system of claim 7, wherein said electronic control panel comprises a processor and an electronic memory.

10. The system of claim 7, wherein said user input device comprises an electronic input device.

11. The system of claim 7, wherein said locking component comprises a latch operable to prevent said door from being opened.

12. The system of claim 7, wherein said mechanical key lock assembly comprises a key receptacle disposed on said door for accepting a key, said key being operable to place said locking component in an unlocked position.

13. A flight deck door locking system for use with a cockpit door, and having a manually overridable locking assembly with a locking component configured to remain locked in the event of a power shortage, for use in an aircraft having a cabin and a cockpit separated by the cockpit door, comprising:

an electronic control panel positionable on the cockpit door facing the cabin for controlling said flight deck door locking system when supplied with power;

a user input device adapted for use with said electronic control panel for enabling a user to input an access code;

a locking assembly disposed on said door, said locking assembly being responsive to said electronic control panel for automatically actuating a locking component into an unlocked condition;

said locking component adapted to remain locked in the event of a power shortage to said flight deck door locking system thereby maintaining said cockpit door in a locked condition;

an input device disposed within said cockpit for enabling an individual within said cockpit to select an automatic unlocking mode, wherein said electronic control panel automatically unlocks said locking component; and a switch positioned on said input device normally biased to an automatic position controlling the automatic unlocking mode, the switch manually positionable from the automatic position to each of an unlock position actuating the locking component into the unlocked condition, and a deny position maintaining the locking component in the locked condition.

14. The system of claim 13, wherein said electronic control panel comprises a processor and an electronic memory.

15. The system of claim 14, wherein said user input device comprises an electronic keypad.

16. The system of claim 15, wherein said locking component comprises a latch operable to prevent said door from being opened.

17. The system of claim 13, comprising a mechanical key lock assembly requiring engagement by a physical key for actuation of said locking component in the event of a power shortage to said flight-deck door locking system wherein said mechanical key lock assembly includes a key receptacle disposed on said door.

18. The system of claim 17, further comprising a camera lens disposed on said door, said camera lens controlled by said electronic control panel and producing images of an area adjacent to said user input device.

19. The system of claim 18, further comprising an audio speaker disposed in said cockpit, said audio speaker controlled by said electronic control panel to provide an audio signal to cockpit personnel alerting cockpit personnel that a user has input an access code into said user input device.

20. The system of claim 19, further comprising a display device disposed in said cockpit and controlled by said electronic control panel to display said images taken by said camera.

21. A flight deck door locking system for use in an aircraft having a manually overridable locking assembly with a locking component configured to remain locked in the event of a power shortage, for use in an aircraft having a cabin and a cockpit separated by a door, comprising:

an electronic control panel for controlling said flight deck door locking system when supplied with power;

a first electronic input device controlled by said electronic control panel for enabling a first user to input access data;

an electronic output device controlled by said electronic control panel for describing the character of said access data to a second user;

a second electronic input device controlled by said electronic control panel for enabling said second user to input confirmation data;

a locking assembly disposed on said door, said locking assembly being responsive to said electronic control panel for automatically actuating a locking component;

said locking component adapted for manual manipulation by one or more manually graspable handles, wherein said electronic control panel controls the enablement of said manually graspable handles in accordance with said confirmation data; and said locking assembly further including a mechanical key lock assembly requiring engagement by a physical key for actuation of said locking component in the event of a power shortage to said flight-deck door locking system.

22. The flight deck door locking assembly of claim 21, wherein said electronic control panel comprises a processor and a electronic storage device.

23. The flight deck door locking assembly of claim 22, wherein said locking component comprises a latch operable to prevent said door from being opened.

24. The flight deck door locking assembly of claim 23, wherein said manually graspable handles are disposed on said cabin and cockpit sides of said door.

25. The flight deck door locking assembly of claim 24, wherein said mechanical key lock assembly comprises a key receptacle disposed on said door wherein a mechanical tumbler mechanism unlocks said flight deck door locking system upon engagement by a physical key.

26. A flight deck door locking system for use in an aircraft having a cabin and a cockpit separated by a door, the system comprising:

an electronic control panel for controlling the flight deck door locking system when supplied with power;

a first electronic input device connected to the electronic control panel for enabling a first user to input access data;

an electronic output device connected to the electronic control panel operable to describe the character of the access data to a second user;

a second electronic input device connected to the electronic control panel operatively enabling the second user to input confirmation data;

a locking assembly having a locking component, the locking assembly being responsive to the electronic control panel for automatically controlling the locking component; and a manually graspable handle adapted for manually manipulating the locking component, wherein the electronic control panel controls the enablement of the manually graspable handle following receipt of the confirmation data;

the locking component comprises a solenoid having a solenoid shaft extendable to operatively lock the locking component, a mechanical lock assembly requiring engagement by a physical key for actuation of the locking component in the event of a power shortage to the flight deck door locking system;

wherein a de-energized condition of the solenoid is required before engagement by the physical key of the mechanical key lock assembly operates the solenoid shaft.

27. The system of claim 26, wherein the locking component comprises a solenoid having a solenoid shaft extendable to operatively lock the locking component.

* * * * *

UNITED STATES PATENT AND TRADEMARK OFFICE
CERTIFICATE OF CORRECTION

PATENT NO. : 6,830,217 B2
DATED : December 14, 2004
INVENTOR(S) : Movsesian et al.

Page 1 of 1

It is certified that error appears in the above-identified patent and that said Letters Patent is hereby corrected as shown below:

<u>Title page,</u>
Item [75], Inventors, fourth inventor's name should read -- Ravinder Jain --.

<u>Column 14,</u>
Line 8, please add claim 28 as follows:

A flight deck door locking system for use with a cockpit door, and having a manually overridable locking assembly with a locking component configured to remain locked in the event of a power shortage, for use in an aircraft having a cabin and a cockpit separated by the cockpit door, comprising:

an electronic control panel for controlling said flight deck door locking system when supplied with power;

a user input device adapted for use with said electronic control panel for enabling a user to input an access code;

a locking assembly disposed on said door, said locking assembly being responsive to said electronic control panel for automatically actuating a locking component into an unlocked condition;

said locking component adapted to remain locked in the event of a power shortge to said flight deck door locking system thereby maintaining said cockpit door in a locked condition;

a camera lens disposed on said door, said camera lens controlled by said electronic control panel and producing images of an area adjacent to said user input device; and an input device disposed within said cockpit for enabling an individual within said cockpit to select an automatic unlocking mode, wherein said electronic control panel automatically unlocks said locking component.

Signed and Sealed this

Twenty-third Day of August, 2005

JON W. DUDAS
*Director of the United States Patent and Trademark Office*